United States Patent [19]

Green

[11] Patent Number: 5,517,376
[45] Date of Patent: May 14, 1996

[54] UNIFORM LOAD DISTRIBUTION DUEL MEMBER DISK CLAMP

[75] Inventor: Robert Green, San Jose, Calif.

[73] Assignee: Conner Peripherals, Inc., San Jose, Calif.

[21] Appl. No.: 201,187

[22] Filed: Feb. 24, 1994

[51] Int. Cl.[6] ........................ G11B 17/022; G11B 17/038
[52] U.S. Cl. ........................... 360/98.08; 360/99.12
[58] Field of Search ........................... 360/98.08, 99.05, 360/99.08, 99.12

[56] References Cited

U.S. PATENT DOCUMENTS

| | | | |
|---|---|---|---|
| 4,065,799 | 12/1977 | Kaczeus | 360/135 |
| 4,403,319 | 9/1983 | Adamek et al. | 360/86 |
| 4,775,906 | 10/1988 | Suzuki et al. | 360/98.08 |
| 4,945,432 | 7/1990 | Matsudaira et al. | 360/98.08 |
| 5,272,581 | 12/1993 | Kojima et al. | 360/98.08 |
| 5,333,080 | 7/1994 | Ridinger et al. | 360/99.08 |

FOREIGN PATENT DOCUMENTS

| | | | |
|---|---|---|---|
| 85105241 | 4/1985 | European Pat. Off. | |
| 89310467 | 10/1989 | European Pat. Off. | |
| 166683 | 6/1990 | Japan | 360/98.08 |

OTHER PUBLICATIONS

IBM Technical Disclosure Bulletin, vol.24, No. 6, Nov. 1981, New York, pp. 2765–2766, J. R. Reidenbach "Method For Disk File Disk Clamping".

Patent Abstracts of Japan, vol. 14, No. 508, (P–1128), Nov. 7, 1990, JP A 2210681 (Hitachi Ltd) Aug. 22, 1990.

IBM Technical Disclosure Bulletin, vol. 27, No. 8, Jan. 1985, New York, pp. 5010–5011, R. W. Luoma, et al. "Cogged Shrink Ring For Disk Clamping".

IBM Technical Disclosure Bulleting, vol. 36, No. 10, Oct. 1993, New York, pp. 73–74, XP 000412189 "Hard Disk Drive Clamp With High Compliance And Low Radial Load".

Patent Abstracts of Japan, vol. 15, No. 435 (P–1272), Nov. 6, 1991, JP A 3183057 (Fujitsu Ltd) Aug. 9, 1991.

*Primary Examiner*—Robert S. Tupper
*Assistant Examiner*—George J. Letscher
*Attorney, Agent, or Firm*—Fliesler, Dubb, Meyer & Lovejoy

[57] ABSTRACT

A disk drive including a disk clamp for clamping one or more disks within the disk drive. The clamp is comprised of a dual member construction which provides a substantially uniform contact pressure at the circular line of contact between the clamp and the disk. The clamp includes an inner ring surrounding and fixedly attached to the hub of the disk drive. The inner ring preferably does not contact the disk. An outer ring is provided having a first portion underneath the inner ring and a second portion provided axially outward from the inner ring. The second portion of the outer ring contacts the disk in a substantially circular line of contact. The inner ring further includes a plurality of threaded holes, through which a plurality of set screws are provided. The screws, when sufficiently threaded through the holes, exert a pressure on the outer ring, which pressure is uniformly transmitted to the disks to secure the disks within the drive.

5 Claims, 7 Drawing Sheets

5,517,376

UNIFORM LOAD DISTRIBUTION DUEL MEMBER DISK CLAMP

BACKGROUND OF THE INVENTION

1. Field of the Invention

The present invention relates to a data storage device, and more particularly, to a structure for securing one or more disks within a disk drive, the structure exerting a clamping force which is substantially uniformly distributed around the disk.

2. Description of the Related Art

Conventional disk drives for use in work stations, personal computers, and portable computers are required to provide a large amount of data storage within a minimum physical space. In general, Winchester type disk drives operate by positioning a read/write transducing head over respective tracks on a rotating magnetic storage disk. Positioning of the head over the tracks is accomplished by an actuator coupled to control electronics, which control the positioning of the actuator and the read/write functions of the heads.

Greater demands are being placed on disk drives by (1) the use of multi-user and/or multi-tasking operating systems, (2) work stations which provide an operating environment requiring the transfer of large amounts of data to and from a hard disk and/or large numbers of disk accesses to support large application programs or multiple users, (3) the present popularity of notebook and laptop computers, and (4) the continuing trend toward higher performance microprocessors. All such systems require a hard drive having high-capacity storage capability, while occupying a minimum of space within the host computer. In order to accommodate these demands, there is a need to produce a smaller hard disk drive which at the same time has an increased storage capacity. For such applications, single drive capacities on the order of hundreds of megabytes are common.

An important determinant in the storage capacity of a disk drive is the flying height of the transducing heads above the rotating disk. In conventional Winchester-type hard drives, once the storage disk achieves a certain angular velocity after start-up of the drive, a cushion of circulating air above the surface of the disk forces the head up off the surface of the disk to thereby achieve a flying height. Having very low flying heights offers several advantages, primary among them is that flying the head very close to the disk surface allows for a high data bit density (i.e., the number of data bits per inch on a data track). The greatest data bit density would be obtained where the transducing head rides in contact with the storage disk. However, the contact of the head and head slider with the disk surface would result in damage to the head and/or disk in an unreasonably short period of time. Thus, there has been an industry wide push to decrease the height at which read/write heads are maintained over the disk surface without actually riding in contact with the disk surface. In the 1960's flying heights were commonly about 100 microinches (μ"). At present, technological advances in read/write heads and disk drive design have allowed the reduction of flying heights to around 4 μ" in commercially viable disk drives.

When a head flies over a disk, the flying height does not remain constant, but rather tends to fluctuate slightly above and below the normal flying height. At lower flying heights, a variation in the fly height may cause the head to randomly contact the disk surface. This situation is referred to as intermittent contact. Presently, flying heights have been reduced to the point where intermittent contact with the disk surface has become an important consideration in the tribology of the head/disk interface. Repeated intermittent contact between the head and a particular location on the disk surface can cause damage to the head and/or disk, and may cause drive failure in an unreasonably short period of time.

In contemporary disk drives, such as the 2½ and 3½ inch form factor drives, special attention must be paid to the structure and method used to clamp the disk or disks within the drive. Due to a combination of factors, distortion in the disk caused by conventional disk clamps has become a significant problem near the inner diameter of the disk. One reason distortion has become a problem relates to the present flying heights of the read/write head over the disk. With the head flying so close to the disk, even slight distortions in the disk surface can cause repeated intermittent contact and drive failure in a short period of time. A second reason why distortion has become a problem relates to the thickness of the disk. In previous generation disk drives, such as the 5¼ inch and larger form factor drives, the disks used were relatively thick, and thus were able to withstand the clamping force of the disk clamp without significant distortion. However, in an effort to minimize the height of 3½ inch and smaller form factor drives, the thickness of the disks used has been reduced to the point where distortion of the disk by the clamp is a potentially significant problem.

Another reason why conventional disk clamps pose significant disk distortion problems relates to the manner in which the clamp secures a disk within the disk drive. In conventional drives, the disk is provided on a cylindrical hub which is affixed to the rotor of the spin motor. A clamp is provided on top of the hub, and has a larger radius than the hub such that an outer circumferencial portion of the clamp is in contact with the disk. A plurality of screws fit through holes around an inner circumferencial portion of the clamp, and into threaded bores in the hub. Conventionally, anywhere from three to eight screws are used in this type of clamp configuration. In smaller disk drives which do not require a large clamping force, a clamp having a single screw through the center of the clamp may alternatively be used. When the screws are tightened, the pressure at the screws is transferred to the outer circumferencial portion of the clamp, which contacts the disk to secure the disk or disks in place. The screws must be secured under a considerable force in order to prevent any slippage, radial movement or tilting of one or more disks. Even a very slight radial movement or tilting of a disk within a drive could result in mechanical off-tracking of the head with respect to the disk, which off-tracking could result in read/write errors.

Ideally, the force exerted by the disk clamp at the circular line of contact defined between the clamp and disk should be uniform around the entire line of contact. However, the clamp is in fact structurally weaker in the area around the screw holes because of the absence of material in the holes. This results in localized stresses at points around the line of contact located radially outward from the screw holes. These localized stresses tend to distort the disk. The stresses are greatest near the inner diameter of the disk, and tend to dissipate toward the outer diameter of the disk, so as to create distortion in the disk similar to patterns 10 on FIG. 1.

At the inner diameter of the disk, the peak to valley distortion of the disk due to non-uniform clamping force may be as high as 10 to 20 microns. Since read/write heads are presently flying at normalized surface heights of less than approximately 4 μ", it is clear that flying the head near the inner diameter of the disk will result in severe and repeated intermittent contact of the head with the high points of the disk, which may result in damage to the head and/or disk and drive failure in an unreasonably short period of time.

SUMMARY OF THE INVENTION

It is therefore an object of the present invention to provide a disk drive capable of reliable and durable operation at extremely low flying heights.

It is a further object of the present invention to provide a disk drive wherein distortion at the inner diameter of the disk is substantially reduced.

It is a still further object of the present invention to provide a clamp for securing a disk within a disk drive in a fixed relation to the hub without causing distortion of the disk.

These and other objects are accomplished by the present invention, which relates to a disk drive including a disk clamp for clamping one or more disks within the disk drive. The clamp is comprised of a dual member construction which provides a substantially uniform contact pressure at the circular line of contact between the clamp and the disk. The clamp includes an inner ring surrounding the hub and fixedly attached thereto by means of threads on the inner diameter of the ring which mate with threads provided on a portion of the hub. The inner ring preferably does not contact the disk. The clamp further includes an outer ring, having a first portion underneath the inner ring and a second portion provided axially outward from the inner ring. The second portion of the outer ring contacts the disk in a substantially circular line of contact. The inner ring further includes a plurality of threaded holes, through which a plurality of set screws are provided. The screws, when sufficiently threaded through the holes, exert a pressure on the outer ring, which in turn exerts a clamping force on the disk to secure the disks within the drive. The outer ring is formed without any holes. Thus, the disks may be securely clamped within the drive through contact by the outer ring, without the localized stresses which result from the screw holes in conventional clamping devices.

BRIEF DESCRIPTION OF THE DRAWINGS

The invention will now be explained with reference to the Figures in which:

FIG. 6b is a cross sectional view of the inner ring through line 6—6 in FIG. 6a;

FIG. 7b is a cross sectional view of the outer ring through line 7—7 in FIG. 7a.

DETAILED DESCRIPTION OF A PREFERRED EMBODIMENT

The invention will now be described with reference to FIGS. 1–7b, which relate to a disk drive with a novel disk clamping design. In a preferred embodiment of the present invention, the clamp design may be used with 2½ and 3½ inch form factor disk drives. However, it is understood that the present invention may operate with disk drives of various sizes and designs, as well as other types of data storage devices, such as optical and laser storage systems.

Figure 1:
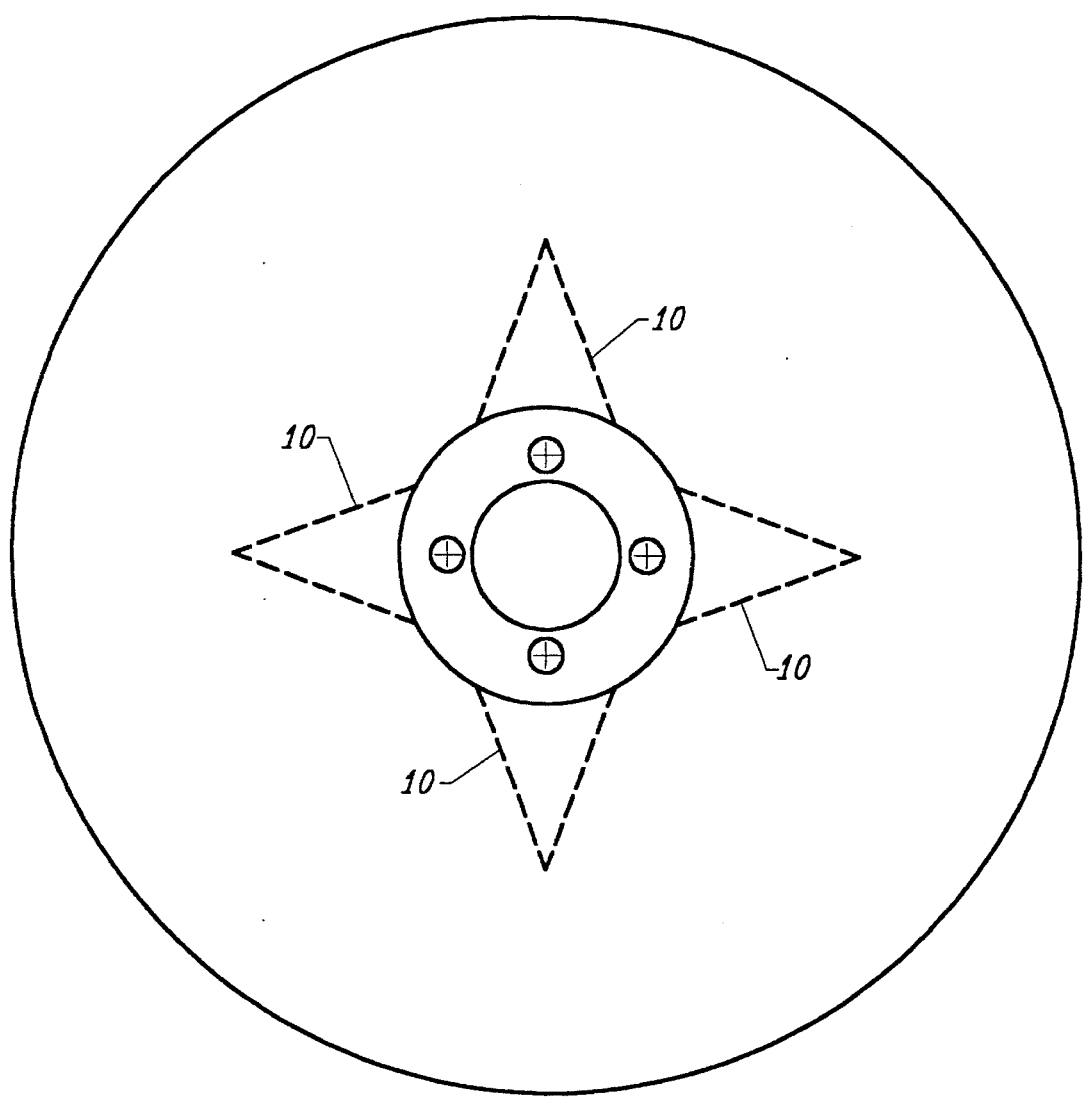
FIG. 1 is a prior art top view of a disk showing a distortion of the disk due to the force of the clamping screws.
Figure 2:
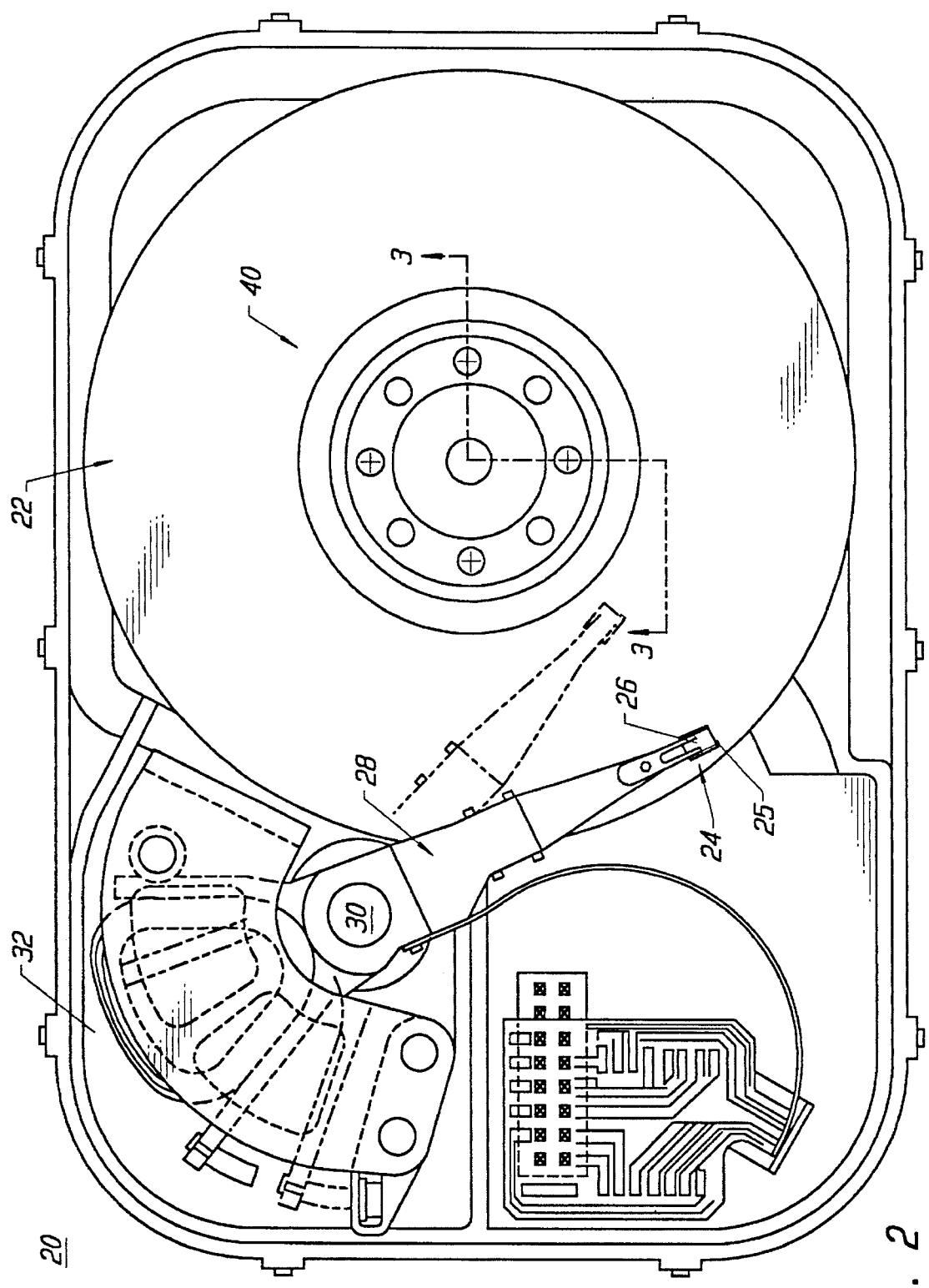
FIG. 2 is a top view of a disk drive according to the present invention.

Referring now to FIG. 2 there is shown a disk drive 20 including storage disks 22 and read/write heads 24. Each read/write head 24 includes a transducer 25 mounted to a slider 26. The sliders 26 are in turn supported on an actuator assembly 28. Transducer 25 may be a conventional inductive transducing element, or in an alternative embodiment, may be a magneto-resistive (MR) transducing element. Actuator assembly 28 is provided to pivot around pin 30 by voice coil motor 32 in response to control signals received from a printed circuit board (not shown). As is known in the art, during operation of the drive 20, disks 22 are rotated by a spin motor 44 (FIG. 3) and actuator assembly 28 pivots read/write heads 24 across the surface of the disks so that data is transferred between the read/write heads 24 and the disks 22 in a plurality of concentric data tracks. Slider 26 of each head 24 is provided to fly a very small distance above the surface of disks 22 as disks 22 rotate. In a preferred embodiment, the heads may have a flying height between 1–4 μ", and optimally about 2.5 μ".

Figure 3:
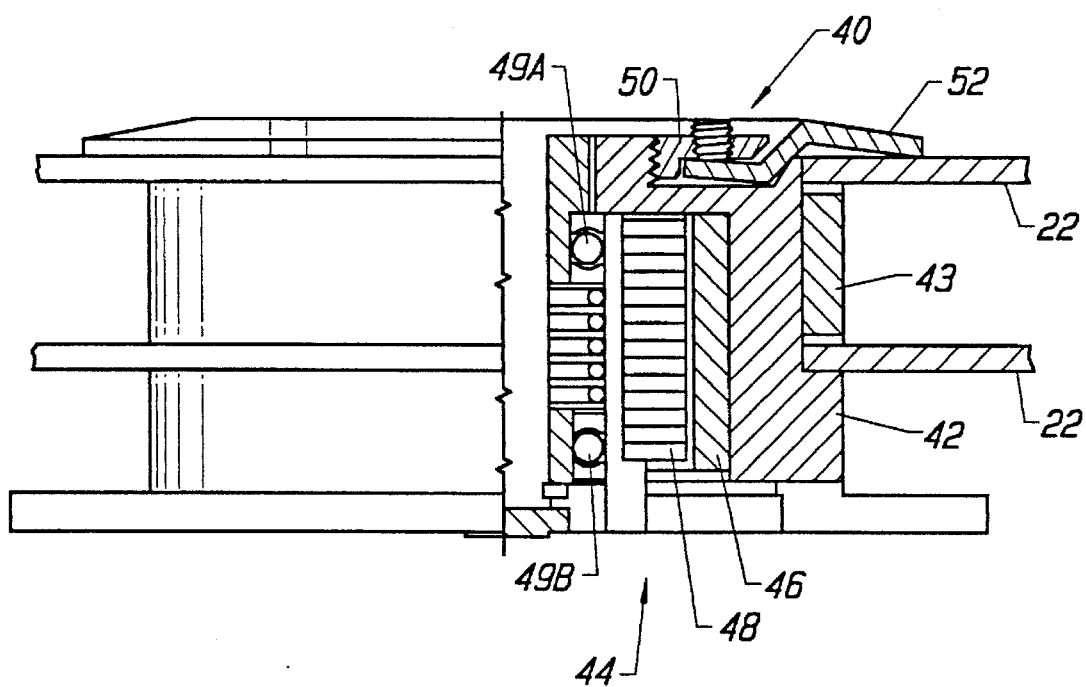
FIG. 3 is a cross-sectional view through line 3—3 in FIG. 2.

As shown in FIGS. 2–7b, disk drive 20 further includes a disk clamp 40 for clamping the disks 22. In the embodiment of FIG. 3, two disks 22 are shown. It is understood, however, that the present invention may utilize one or more disks 22. In general, disks 22 fit over a hub 42, and are separated and held in parallel relation to each other by means of an annular spacer 43 between each disk 22 in the drive. The hub is adjacent to a spin motor generally shown at 44. The spin motor is comprised of a magnetic rotor 46 and stationarily mounted stator windings 48. The hub 42 is affixed to the rotor 46, with the hub 42 and rotor 46 both rotatably supported on bearings 49a and 49b to allow rotation of the hub and rotor as a singular unit. As is known in the art, commutation of an electrical current through windings 48 will cause the rotor 46 to rotate, thus rotating disks 22. It is understood to be within the scope of the invention that various other structures may be substituted for the structures described above for supporting and rotating the disks 22 as is known in the art.

Figure 4:
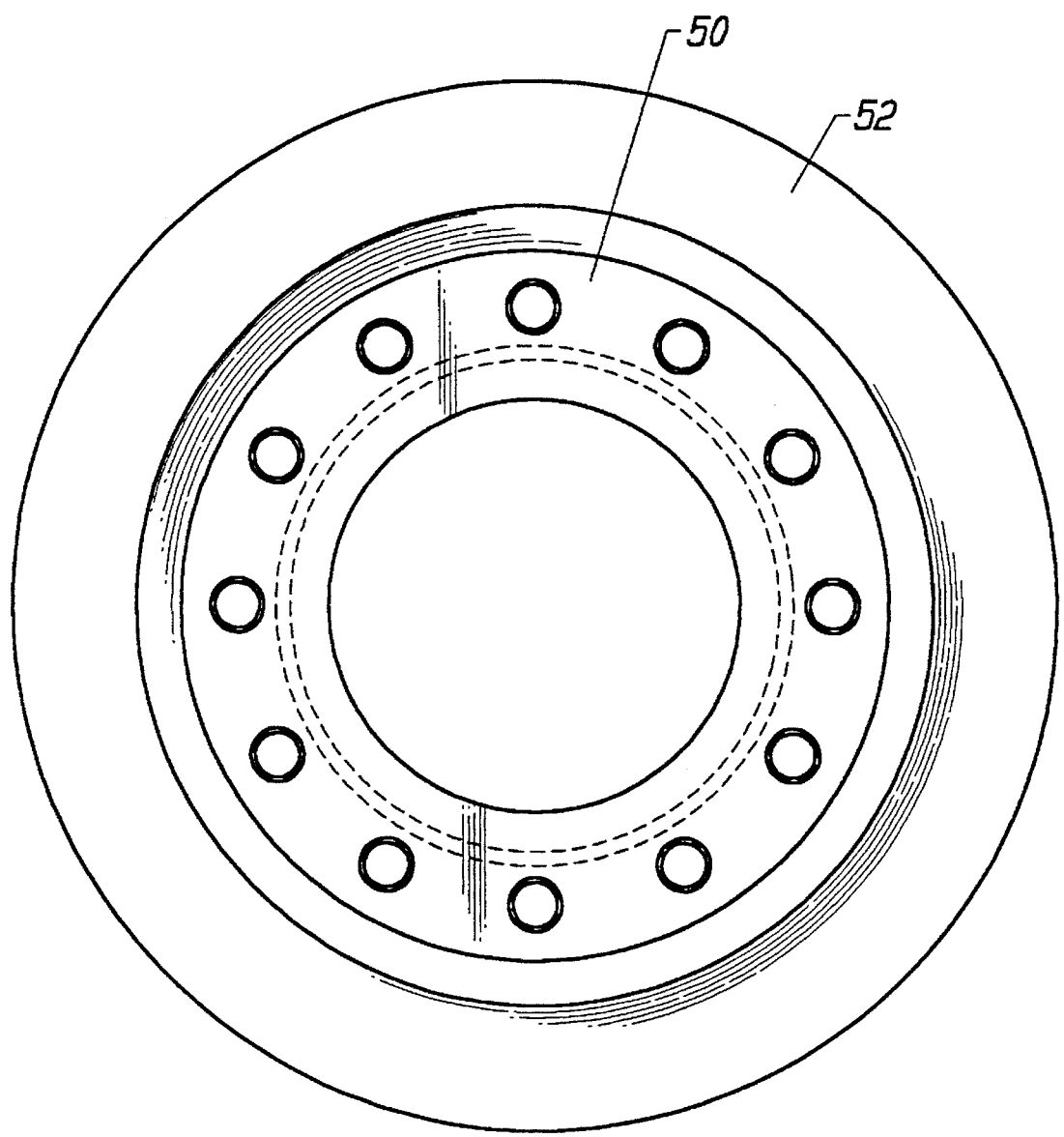
FIG. 4 is a top view of a disk clamp according to the present invention.
Figure 5:
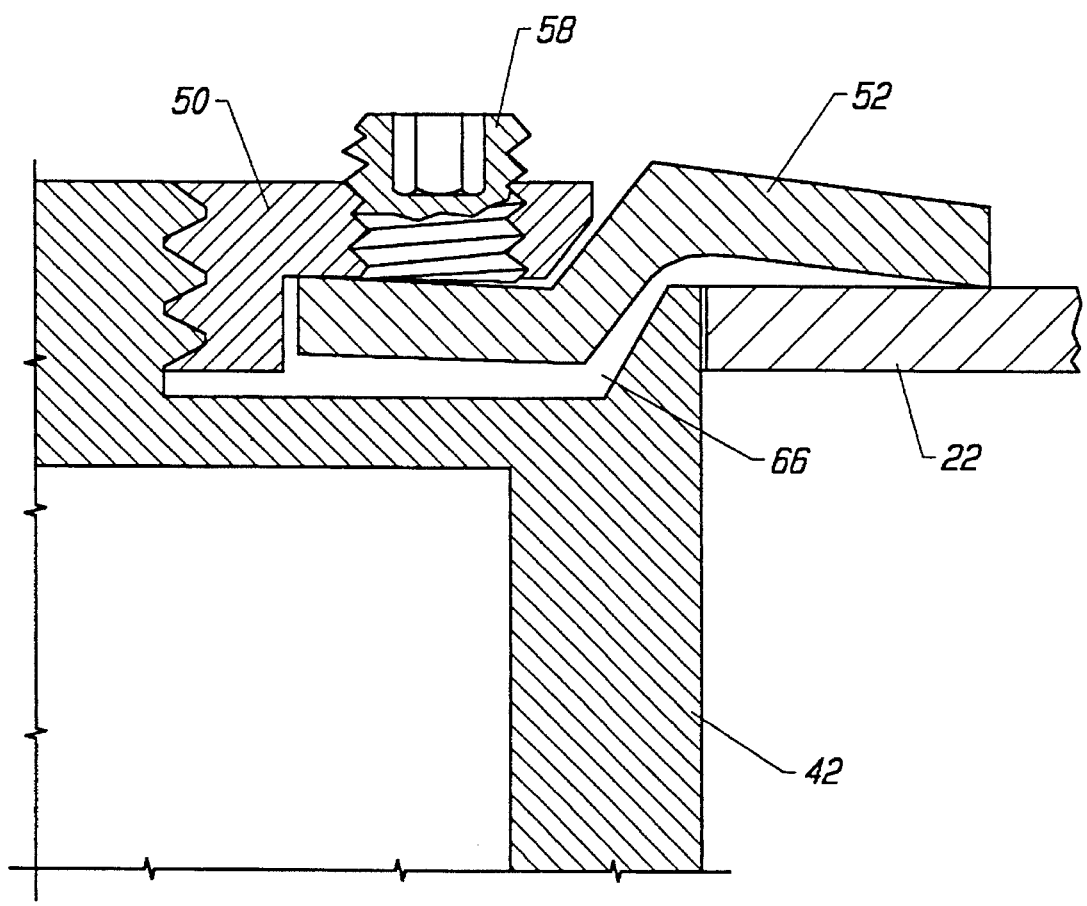
FIG. 5 is a cross-sectional view of a disk clamp through line 5—5 in FIG. 4.
Figure 6A:
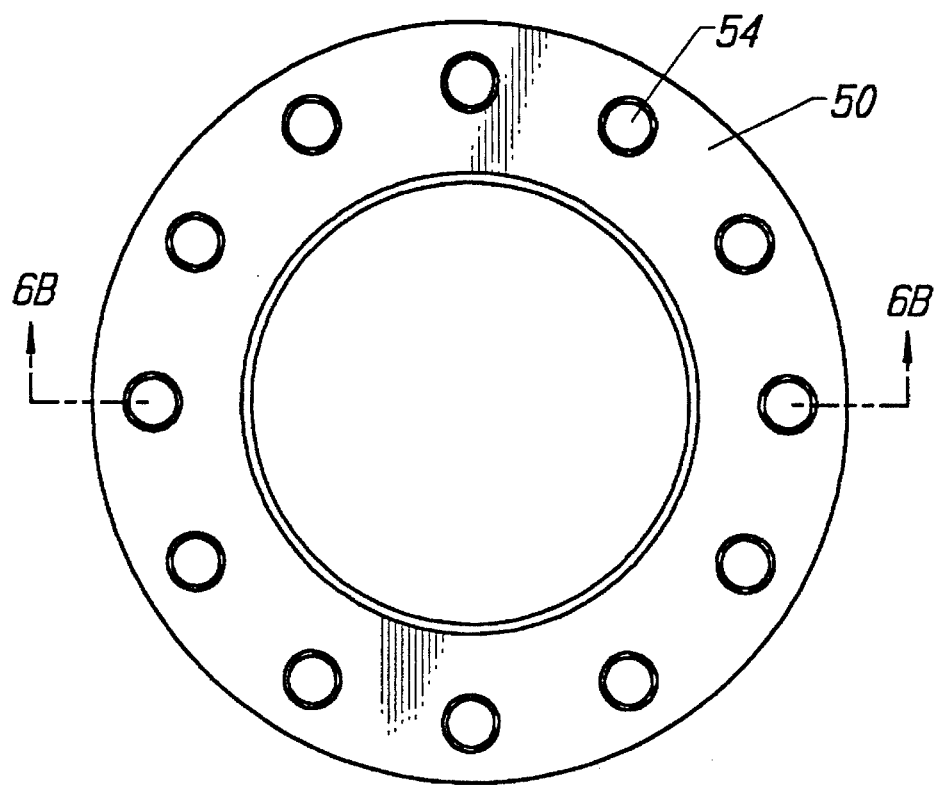
FIG. 6a is a top view of an inner ring of the disk clamp according to the present invention.
Figure 6B:
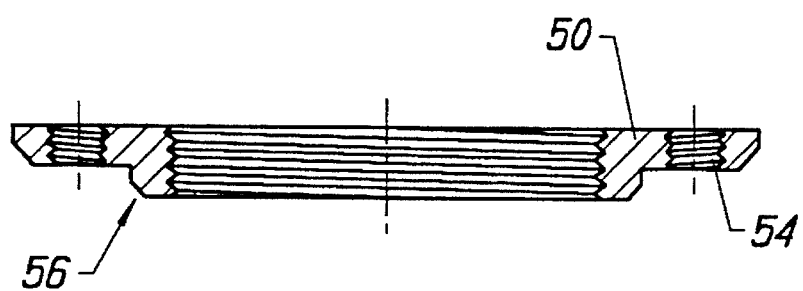

With specific regard to the disk clamp 40 shown in FIGS. 3–5, the clamp is formed of separate inner and outer rings, 50 and 52, respectively. As seen in FIGS. 6a and 6b, the inner ring 50 is preferably formed of stainless steel or a comparable material, and preferably has inner and outer diameters of 0.59 inches and 0.92 inches, respectively. The thickness of the inner ring in an outer circumferential portion of the ring including the screw holes 54 is preferably about 0.04 inches, and the thickness of the inner circumferential portion of the ring is about 0.08 inches. The inner and outer circumferential portions of the inner ring may be separated by a chamfered section 56 to increase the structural rigidity of the inner ring 50. The above dimensions, and those set forth hereinafter, are for clamps used in 3½ inch form factor disk drives. It is understood that these dimensions will vary in disks drives of other sizes.

The inner diameter of the inner ring 50 is preferably threaded so as to mate with threads provided on the outer diameter of the hub 42, thus allowing the inner ring 50 to be securely affixed to the hub 42 when screwed thereon. The inner ring 50 further includes a plurality of screw holes 54. In a preferred embodiment of the invention, there are twelve such holes 54, but there may be more or less screw holes in alternative embodiments. The center of the screw holes are provided preferably about 0.378 inches from the center point of the inner ring. As will be explained in greater detail below, each screw hole 54 is threaded to receive a set screw 58, which set screws together serve to load the outer ring 52.

Figure 7A:
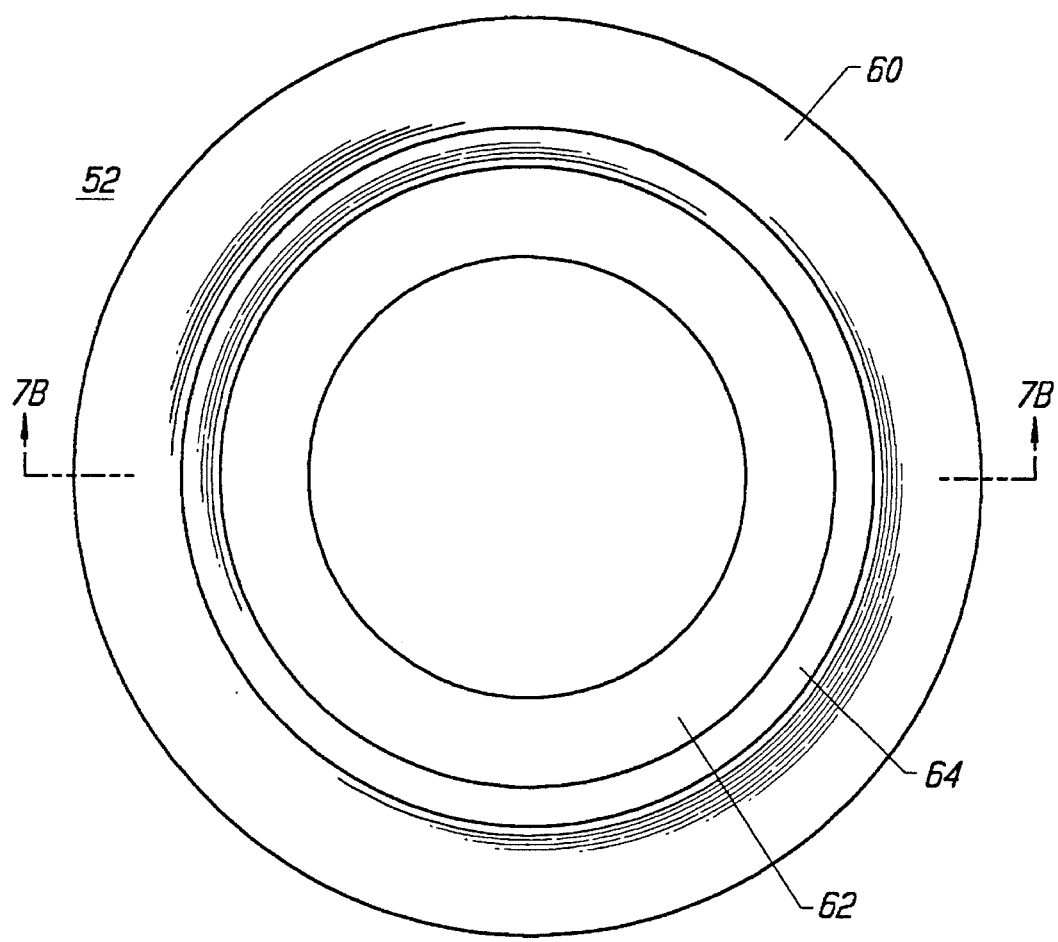
FIG. 7a is a top view of an outer ring of the disk clamp according to the present invention.
Figure 7B:
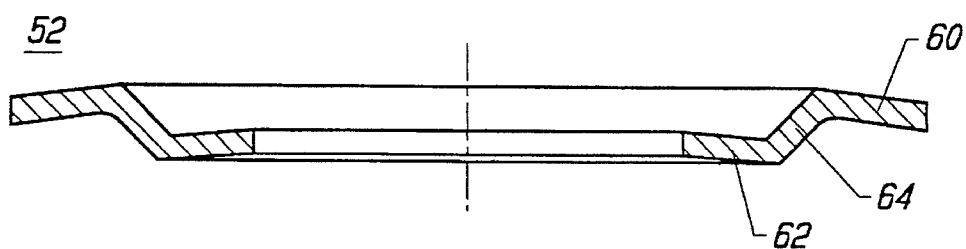

The outer ring 52 preferably has a substantially "Z"-shaped configuration as shown in the top and cross sectional views of FIGS. 7a and 7b. The ring 52 is preferably formed of aluminum or comparable material, and preferably has inner and outer diameters of about 0.67 inches and 1.20 inches, respectively. The thickness of the outer ring 52 is preferably about 0.035 inches. The ring 52 includes disk-contacting section 60, screw-contacting section 62, and diagonal section 64 extending obtusely between, and connecting, sections 60 and 62.

As seen in FIGS. 3 and 5, the hub 42 is formed with a well portion 66, in which resides the inner ring 50 and the screw-contacting section 62 of the outer ring 52. The diagonal section 64 extends up and out of the well portion 66, and positions disk contacting section 60 to contact an upper disk 22 in a substantially circular line of contact.

In operation, set screws 58 are provided through threaded holes 54 in the securely mounted inner ring 50. In a preferred embodiment, there may be six set screws 58, with six screw holes 54 left open for balancing. There may be more or less than six screws 58 in alternative embodiments. When inserted through holes 54, the screws 58 contact and exert a pressure on the screw-contacting section 62, thereby loading the outer ring 52. By tightening each set screw 58 around the clamp 40 the same amount, a substantially uniform load may be exerted on disks 22 by outer ring 52 in a substantially circular line of contact between outer ring 52 and the upper disk 22. This load is sufficient to prevent slippage, radial movement or tilting of the disks 22. A feature of the present invention is that the outer ring 52 is loaded without having any screw holes provided therein. As stated in the Background of the Invention section, the provision of holes in a clamping ring is a significant source of localized stresses in the disk. Conventional clamping rings are structurally weaker at, and radially outward from, the holes in the clamp. This structural weakness results in an uneven force being exerted on the disks. The lack of holes in the loaded outer ring of the present invention allows the outer ring to exert a substantially uniform load on the disks 22. Thus the disks 22 may be securely clamped with the disk drive 20 substantially without the distortion seen in disks of conventional disk drives.

Although the invention has been described in detail herein, it should be understood that the invention is not limited to the embodiments herein disclosed. For example, it is understood that the specific size limitations recited with respect to the various dimensions of the clamp 40 may be varied and still be within the scope of the invention. Various other changes, substitutions and modifications may be made to the present invention by those skilled in the art without departing from the spirit or scope of the invention as described and defined by the appended claims.

I claim:

1. A disk clamp for securing at least one storage disk within a disk drive, comprising:

a first annular member securely affixed to a hub of the disk drive, said first annular member including a plurality of threaded holes, one threaded hole of said plurality of said threaded holes mating with threads formed on a portion of said hub to thereby securely affix said first annular member to said hub;

a second annular member concentric with said first annular member and having a central opening and no other holes therethrough, said first annular member exerting a compressive force on said second annular member, said second annular member contacting an upper disk of the at least one disk and uniformly transmitting said force to the at least one disk to secure the at least one disk within the disk drive; and a plurality of screws provided through at least some of said plurality of threaded holes and contacting a top surface of said second annular member, said plurality of screws exerting a load on said second annular member, said second annular member uniformly transmitting said load to the at least one disk to secure the at least one disk within the disk drive.

2. A disk clamp as recited in claim 1, wherein said first annular member is comprised of stainless steel.

3. A disk clamp as recited in claim 1, wherein said second annular member is comprised of aluminum.

4. A disk clamp as recited in claim 1, wherein said second annular member has a substantially "Z"-shaped construction, said plurality of screws contacting a first section of said member, a second section of said member contacting said upper disk of the at least one disk, and a third section extending obtusely between, and connecting, said first and second sections.

5. A disk clamp as recited in claim 1, wherein said plurality of screws comprises six screws.

* * * * *